(12) United States Patent
Xie et al.

(10) Patent No.: US 10,268,606 B2
(45) Date of Patent: Apr. 23, 2019

(54) METHOD, DEVICE AND SYSTEM FOR SWITCHING ACCESS MODES FOR DATA STORAGE DEVICE

(71) Applicant: Shenzhen China Star Optoelectronics Technology Co., Ltd., Shenzhen (CN)

(72) Inventors: Jianjun Xie, Shenzhen (CN); Li-wei Chu, Shenzhen (CN); Yuhong Fu, Shenzhen (CN); Jian Gao, Shenzhen (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 314 days.

(21) Appl. No.: 15/128,972

(22) PCT Filed: Jul. 12, 2016

(86) PCT No.: PCT/CN2016/089736
§ 371 (c)(1),
(2) Date: Sep. 24, 2016

(87) PCT Pub. No.: WO2017/201829
PCT Pub. Date: Nov. 30, 2017

(65) Prior Publication Data
US 2018/0173651 A1    Jun. 21, 2018

(30) Foreign Application Priority Data
May 23, 2016 (CN) .......................... 2016 1 0346269

(51) Int. Cl.
*G06F 3/00* (2006.01)
*G06F 13/16* (2006.01)
(Continued)

(52) U.S. Cl.
CPC ........ *G06F 13/1668* (2013.01); *G06F 3/0604* (2013.01); *G06F 3/0634* (2013.01);
(Continued)

(58) Field of Classification Search
CPC ............ G06F 13/1668; G06F 13/4022; G06F 3/0604; G06F 3/0673; G06F 3/0634; G06F 13/1689; G06F 13/16; G06F 2213/0016
See application file for complete search history.

(56) References Cited

U.S. PATENT DOCUMENTS

2004/0215786 A1* 10/2004 Ohnishi ............... H04N 21/231
                                                               709/227
2005/0265377 A1* 12/2005 Mizuno ................. H04J 3/0688
                                                               370/463
(Continued)

FOREIGN PATENT DOCUMENTS

CN            101814058 A   *   8/2010

*Primary Examiner* — Jing-Yih Shyu
(74) *Attorney, Agent, or Firm* — Mintz Levin Cohn Ferris Glovsky and Popeo, P.C.; Kongsik Kim; Jhongwoo Jay Peck

(57) ABSTRACT

A data storage device access method, a device and a system. The method includes receiving a mode switch control command by a first bus through a first interface of the control device; switching a second interface of the control device to a predetermined mode based on the received mode switch control command. In cases where the second interface is switched to the first mode in accordance with the mode switch control command, the other device connected to a second bus corresponding to the second interface, accesses the data storage device under the control of the control device via the second interface through the second bus. In cases where the second interface is switched to the second mode in accordance with the mode switch control command,
(Continued)

the other device directly accesses the data storage device through the second bus without the control of the control device.

9 Claims, 3 Drawing Sheets

(51) Int. Cl.
*G06F 3/06* (2006.01)
*G06F 13/40* (2006.01)

(52) U.S. Cl.
CPC ............ *G06F 3/0673* (2013.01); *G06F 13/16* (2013.01); *G06F 13/1689* (2013.01); *G06F 13/4022* (2013.01); *G06F 2213/0016* (2013.01)

(56) References Cited

U.S. PATENT DOCUMENTS

| | | | |
|---|---|---|---|
| 2009/0234797 A1* | 9/2009 | Uno | G06F 21/62 |
| 2013/0159593 A1* | 6/2013 | Yeung | G06F 13/4022 |
| | | | 710/316 |
| 2014/0163716 A1* | 6/2014 | Chang | G06F 1/26 |
| | | | 700/117 |
| 2016/0313940 A1* | 10/2016 | Somaiya | G06F 1/3268 |

* cited by examiner

METHOD, DEVICE AND SYSTEM FOR SWITCHING ACCESS MODES FOR DATA STORAGE DEVICE

CROSS REFERENCE TO RELATED APPLICATION

This application is the U.S. national phase of PCT Application No. PCT/CN2016/089736 filed on Jul. 12, 2016, which claims priority to CN Patent Application No. 201610346269.4 filed on May 23, 2016, the disclosures of which are incorporated in their entirety by reference herein.

BACKGROUND OF THE INVENTION

1. Field of the Disclosure

The present disclosure relates to the technical field of controlling of data storage device access, and specifically speaking, to a method and a control device for accessing a data storage device through a control device when a bus contention exists, a programming device and a data storage device access method of the programming device, and a data storage device access method and system.

2. Description of the Prior Art

In recent years, with the increasing demand on the access speed of data storage device, when a plurality of devices are connected to the same bus (such as SPI bus and so on), if there has been a device (as the Master device) occupying the bus to access the data storage device, then the data storage device is generally accessed by the input devices via the control over the peripheral bus switch control circuit, and an access to the data storage device by a new Master device on the bus is realized by cutting off communication between the current Master device and the data storage device on the bus, or the current Master device is controlled through other types of bus so as to access the data storage device via the current Master device on the bus as the transit.

For example, the mid-high end timer controller (TCON) may include both I2C and SPI interfaces at the same time. When performing a read-write operation on the data storage devices such as Flash, after powering up, an SPI Master controller of TCON first downloads configuration parameters from the Flash, and is then kept in Master mode after the download, at this point, an SPI controller of the programming device cannot perform the read-write operation directly on the Flash as the TCON SPI Master controller occupies the bus. Since the I2C interface of the TCON is a Slave mode, the programming device I2C Master may be used to transmit an instruction or data to the I2C Slave of TCON, then, after receiving the instruction or data from the I2C interface, the TCON performs the read-write operation on the Flash through the SPI Master controller.

However, the above method has the following defect: the peripheral circuit should be further provided with the bus switch control circuit (hereinafter referred to as Switch IC), which may complicate the design of circuit system and affect the cost of the system; the efficiency of accessing the data storage device via the current Master device as the transit is relatively low, which goes against the read/write of mass data.

SUMMARY

In order to overcome the defects of the prior art, an exemplary embodiment of the present disclosure provides a method compatible for accessing the data storage device through two different buses when canceling the peripheral Switch IC, and a device and a system for realizing the method.

In accordance with an aspect of an exemplary embodiment of the present disclosure, there is provided a method of accessing a data storage device through a control device, the method including: receiving a mode switch control command through a first bus via a first interface of the control device, wherein the mode switch control command is used for controlling to switch a second interface of the control device to a predetermined mode; switching the second interface of the control device to a predetermined mode based on the received mode switch control command, wherein the predetermined mode includes a first mode and a second mode; wherein in case where the second interface is switched to the first mode in accordance with the mode switch control command, an input device connected to a second bus corresponding to the second interface accesses the data storage device under the control of the control device via the second interface through the second bus; in case where the second interface is switched to the second mode in accordance with the mode switch control command, the input device directly accesses the data storage device through the second bus without the control of the control device.

In accordance with an aspect of the present disclosure, the method may further include: generating status data corresponding to a current mode of the second interface based on a mode confirmation instruction received by the control device so that the input devices may determine whether the second interface has been switched to a predetermined mode based on the status data.

In accordance with an aspect of the present disclosure, steps of switching the second interface of the control device to the predetermined mode may include: activating a first control module corresponding to the first mode and a second control module corresponding to the second mode in the control device in accordance with the mode switch control command, wherein when the first control module is initiated, the second interface is in the first mode, when the second control module is initiated, the second interface is in the second mode, wherein in the first mode, the input device may access the data storage device under the control of the first control module via the second interface through the second bus, and in the second mode, the input device may directly access the data storage device through the second bus without the control of the control device.

In accordance with an aspect of the present disclosure, a step of accessing the data storage device via the second interface through the second bus may include: receiving a write command or data to be written, or a read command about the data storage device via the first interface of the control device through the first bus, and buffering the received command and data, wherein a step of accessing the data storage device via the second interface through the second bus may further include: converting the received write command and the data to be written or the read command into a format which may be transmitted through the second bus, and transmitting the converted command and data to the data storage device via the second interface through the second bus.

In accordance with an aspect of the present disclosure, the first interface may be an I2C interface, the first bus may be an I2C bus.

In accordance with an aspect of the present disclosure, the second interface may be an SPI interface, the second bus may be an SPI bus, the first mode may be a Master mode, and the second mode may be a Slave mode.

In accordance with an aspect of the present disclosure, the control device may be a TCON, the input device may be a programming device, and the data storage device may be a Flash.

In accordance with another aspect of the present disclosure, there is provided a control device including: a receiving module configured to receive a mode switch control command through a first bus via a first interface of the control device, wherein the mode switch control command is used for controlling to switch a second interface of the control device to a predetermined mode, wherein the predetermined mode includes a first mode and a second mode; a second interface control module configured to switch the second interface of the control device to a predetermined mode in accordance with the mode switch control command; a second interface configured to access data storage device connected to the control device through the second bus corresponding to the second interface, wherein in case where the second interface is switched to the first mode, the input device connected to the second bus corresponding to the second interface may access the data storage device via the second interface through the second bus, and in case where the second interface is switched to the second mode, the input device may directly access the data storage device through the second bus without the control of the control device.

In accordance with another aspect of the present disclosure, the receiving module may also be configured to receive a mode confirmation instruction, wherein the control device may further include: a mode confirmation module configured to generate status data corresponding to a current mode of the second interface based on the received mode confirmation instruction so that the input device may determine whether the second interface has been switched to a predetermined mode based on the status data.

In accordance with another aspect of the present disclosure, the second interface control module may include a first control module corresponding to the first mode and a second control module corresponding to the second mode, wherein the control device initiates the first control module and the second control module in accordance with the mode switch control command, wherein when the first control module is initiated, the second interface is in the first mode, when the second control module is initiated, the second interface is in the second mode, wherein in the first mode, the input device may access the data storage device under the control of the first control module via the second interface through the second bus, and in the second mode, the input device may directly access the data storage device through the second bus without the control of the control device.

In accordance with another aspect of the present disclosure, the receiving module may also be configured to receive a write command or data to be written, or a read command about the data storage device via the first interface of the control device through the first bus, wherein the control device may further include: a cache configured to buffer the received command and data; a format conversion module configured to convert the received write command and the data or the read command into a format which may be transmitted through the second bus, wherein the second interface may also be configured to transmit the converted command and data to the data storage device through the second bus.

In accordance with another aspect of the present disclosure, the first interface may be an I2C interface, the first bus may be an I2C bus.

In accordance with another aspect of the present disclosure, the second interface may be an SPI interface, the second bus may be an SPI bus, the first mode may be a Master mode, and the second mode may be a Slave mode.

In accordance with another aspect of the present disclosure, the control device may be a TCON, an input device may be a programming device, and the data storage device may be a Flash.

In accordance with another aspect of the present disclosure, there is provided a programming device including: a transmission module configured to transmit a mode switch control command to a control device via a first interface of the control device through the first bus, wherein the mode switch control command is used for switching a second interface of the control device to a predetermined mode, wherein the predetermined mode includes a first mode and a second mode; the data storage device access module is configured to access the data storage device under the control of the control device via the second interface through the second bus in case where the second interface is switched to the first mode in accordance with the mode switch control command; in case where the second interface is switched to the second mode in accordance with the mode switch control command, the data storage device is directly accessed through the second bus without the control of the control device.

In accordance with another aspect of the present disclosure, there is provided a method of accessing a data storage device by a programming device, the method including: transmitting a mode switch control command to a control device via a first interface of the control device through a first bus, wherein the mode switch control command is used for switching a second interface of the control device to a predetermined mode, wherein the predetermined mode includes a first mode and a second mode; in case where the second interface is switched to the first mode in accordance with the mode switch control command, accessing the data storage device under the control of the control device via the second interface through the second bus; in case where the second interface is switched to the second mode in accordance with the mode switch control command, the data storage device is directly accessed through the second bus without the control of the control device.

In accordance with another aspect of the present disclosure, there is provided a data storage device access system, the system including: a first bus and a second bus configured to perform communication between devices; the input device are connected to the second bus and are configured to transmit a mode switch control command to a control device via the first interface of the control device through the first bus, wherein the mode switch control command is used for switching a second interface of the control device to a predetermined mode; a control device configured to switch the second interface of the control device to a predetermined mode based on the received mode switch control command, wherein the predetermined mode includes a first mode and a second mode; a data storage device configured to be accessible for the control device and input device; wherein in case where the control device switches the second interface to the first mode in accordance with the mode switch control command, the input device accesses the data storage device under the control of the control device via the second interface through the second bus, and in case where the control device switches the second interface to the second mode in accordance with the mode switch control command, the input device directly accesses the data storage device through the second bus without the control of the control device.

In accordance with another aspect of the present disclosure, there is provided a data storage device access method, the method including: transmitting a mode switch control command to a control device via a first interface of the control device through a first bus, wherein the mode switch control command is used for switching a second interface of the control device to a predetermined mode; switching the second interface of the control device to a predetermined mode based on the mode switch control command, wherein the predetermined mode includes a first mode and a second mode; wherein in case where the second interface is switched to the first mode in accordance with the mode switch control command, the input device connected to a second bus corresponding to the second interface accesses the data storage device under the control of the control device via the second interface through the second bus; in case where the second interface is switched to the second mode in accordance with the mode switch control command, the input device directly accesses the data storage device through the second bus without the control of the control device.

Other aspects and/or advantages of the present disclosure will be partially illustrated in the following description, and the rests will be clarified through further description or implementation of the present disclosure.

BRIEF DESCRIPTION OF THE DRAWINGS

These and/or other aspects and advantages of the disclosure will become apparent and more readily appreciated from the following description of the embodiments, taken in conjunction with the accompanying drawings in which.

DETAILED DESCRIPTION OF EXEMPLARY EMBODIMENTS

Figure 1:
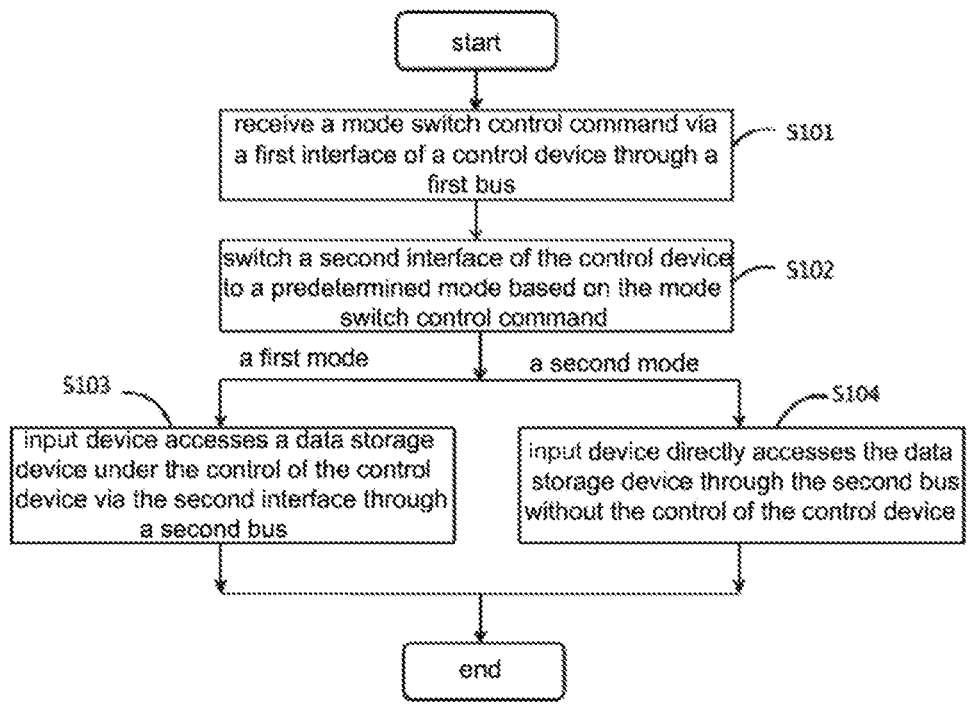
FIG. 1 is a flow diagram of a method of accessing the data storage device through a control device in accordance with the exemplary embodiment of the present disclosure.

Here a detailed reference will be made with respect to the exemplary embodiments of the present disclosure, in which the examples are shown in the drawings, wherein the same drawing reference marks may indicate the same component. Embodiments of the present disclosure will be described in detail below by referring to the accompany drawings.

It should be understood that, in the present disclosure, the control device may be any control devices having at least two types of bus interface and capable of accessing the data storage device, for example, the timer controller (TCON) and various types of single-chip controller (such as ARC etc.) and so on. Here, a method of accessing the data storage device through a control device in accordance with the exemplary embodiment of the present disclosure will be illustrated in conjunction with FIG. 1 and FIG. 2.

FIG. 1 is a flow diagram of a method of accessing the data storage device through a control device in accordance with the exemplary embodiment of the present disclosure.

As shown in FIG. 1, first, in step S101, the control device receives a mode switch control command from an input device. Here, the input devices may also be any devices connected with the control device to the same bus (for example, the SPI bus, etc.) and capable of accessing the data storage device, for example, when the control device is the TCON in the liquid crystal screen driving system, the input device may be a programming device, while those skilled in the art may know that the control device and the input device are not limited to the example illustrated hereby, instead, they may change depending on the different application scenarios.

In an exemplary embodiment, the mode switch control command may be any commands used for switching a second interface of the control device to a predetermined mode, and the mode switch control command may be preset by a user. For example, a user may set the corresponding mode switch control command based on a predetermined transmission protocol between the control device and the input device so as to switch the second interface of the control device to a predetermined mode. Here, the control device and the input device may be connected to a second bus corresponding to the second interface, wherein the second interface may be any bus interface, either a parallel bus interface or a serial bus interface. As an example, the second interface may be an SPI interface, or an I2C interface, etc., and when the second interface is the SPI interface, the second bus is an SPI bus.

The predetermined mode in accordance with the exemplary embodiment indicates a mode of the second interface of the control device, and the predetermined mode may includes a first mode and a second mode, wherein the first mode may be a Master mode, and the second mode may be a Slave mode. For example, when the second interface is the SPI interface, the first mode is a Master mode, and the second mode is a Slave mode. However, it should be understood that, the corresponding predetermined mode may be set based on the specific application scenario, and the predetermined mode is not limited to the above two modes. The terms "first" and "second" as mentioned below are only used to distinguish one from another, instead of limitation. For example, the "first mode" may be called the "second mode", and the "second mode" may also be called the "first mode".

In addition, the control device may receive a mode switch control command from the input device through various means. For example, the control device may receive a mode switch control command via a first interface through a first bus. Here, the first interface may be any other interfaces capable of performing data communication than the second interface of the control device, and the first bus may be a bus corresponding to the first interface. As an example, the first interface may be an I2C interface, and the first bus may be an I2C bus, while the exemplary embodiment of the present disclosure is not limited thereto.

When the control device receives the mode switch control command in step S101, in step S102, the control device may switch the second interface of the control device to the predetermined mode based on the received mode switch control command. Here, in case where the second interface is switched to the first mode in accordance with the mode switch control command, in step S103, the input device connected to a second bus corresponding to the second interface accesses the data storage device under the control of the control device via the second interface through the second bus, while in case where the second interface is switched to the second mode in accordance with the mode switch control command, in step S104, the input device may directly access the data storage device through the second bus without the control of the control device. Here, the data storage device may be any type of data storage device, such as Flash and EPROM, etc.

Specifically speaking, in step S102, the control device may initiate the first control module corresponding to the first mode and the second control module corresponding to the second mode in the control device in accordance with the received mode switch control command, so as to control the second interface to be in corresponding mode. Here, when the first control module in the control device is initiated, the second interface may be in the first mode, when the second control module in the control device is initiated, the second interface may be in the second mode, wherein under the first mode, the input device may access the data storage device under the control of the first control module via the second interface through the second bus, while under the second mode, the input device may directly access the data storage device through the second bus without the control of the control device.

Thus it can be seen that, the method of accessing the data storage device in accordance with the exemplary embodiment of the present disclosure solves the problem of conflict occurred in accessing the data storage device caused by more than one Master device on the bus, and may provide the data storage device access methods compatible to two different buses at the same time through the mode switch control, one method is switching the second interface of the control device to the first mode so as to access the data storage device by means of converting the second bus to the first bus, and the other method is switching the second interface of the control device to the second mode so as to directly access the data storage device through the second bus. In practice, one of the above two methods may be chosen based on the amount of the read/written data and the specific application scenario, and in particular, the second method facilitates the fast reading/writing of the data storage device.

Specifically speaking, a step of accessing the data storage device via the second interface of the control device through the second bus may include: receiving a read command or write command of the data storage device and the data to be written, and buffering the received command and data, for example, the control device may receive the read command or the write command and the data to be written via the first interface of the control device through a first bus, and may store the received command and data in the buffer of the control device. In this case, since different buses support different data formats, the method of accessing the data storage device in accordance with the exemplary embodiment of the present disclosure may also convert the received write command and the data to be written or the read command into a format which may be transmitted through the second bus, and may transmit the converted command and data to the data storage device via the second interface through the second bus, so as to write the data to be written into the data storage device based on the write command, or to read the data from the data storage device based on the read command. In addition, the data read from the data storage device may be buffered in the cache of the control device so as to facilitate other devices to read the data through the other interfaces (such as the first interface) of the control device.

In addition, in order to ensure the effectiveness of the mode switch, the input device may further determine whether the second interface of the control device has been switched to a predetermined mode, so as to ensure that the second interface of the control device operates in a desired work mode to facilitate the subsequent data storage device access. For this purpose, preferably, the method of accessing the data storage device through a control device in accordance with the exemplary embodiment of the present disclosure may further include a step of generating status data corresponding to a current mode of the second interface. Specifically speaking, the status data corresponding to a current mode of the second interface may be generated based on a mode confirmation instruction received by the control device, so that the input device may determine whether the second interface has been switched to a predetermined mode based on the status data. Here, the mode confirmation instruction may be an instruction transmitted by the input devices based on a predetermined protocol between the input device and the control device, and the status data may also be the data corresponding to the mode of the second interface and preset based on the predetermined protocol between the input device and the control device, so as to facilitate the input device to determine the mode of the second interface indicated by the status data based on the predetermined protocol between the input device and the control device upon receiving the status data from the control device.

In the method of accessing the data storage device through a control device in accordance with the exemplary embodiment of the present disclosure, as an example, the control device may be a TCON, the input device may be a programming device, the data storage device may be a Flash, the first interface may be an I2C interface, the first bus may be an I2C bus, the second interface may be an SPI interface, the second bus may be an SPI bus, the first mode may be a Master mode, and the second mode may be a Slave mode. Here, the above example will be taken with reference to FIG. 2 to further illustrate the method of accessing the data storage device through a control device in accordance with the exemplary embodiment of the present disclosure.

Figure 2:
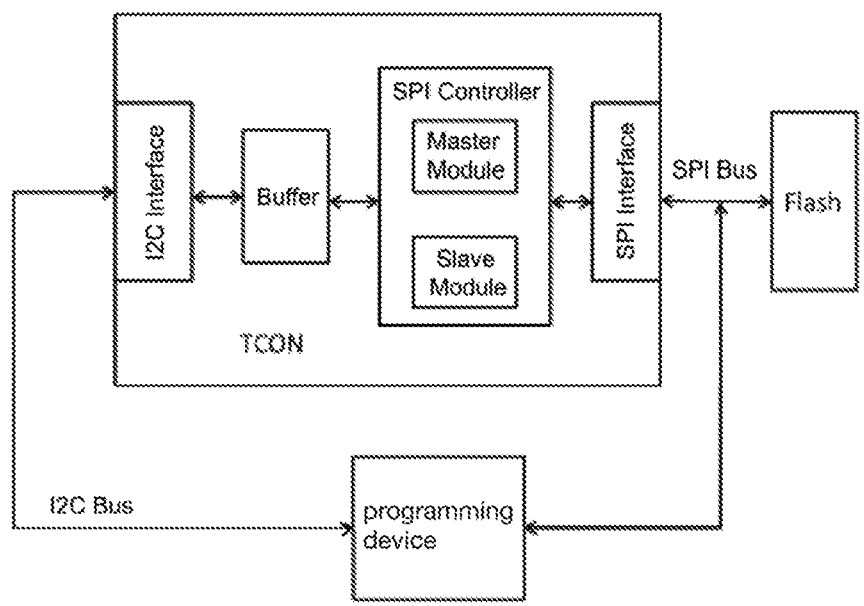
FIG. 2 is a diagram of a method of accessing the data storage device through a control device in accordance with the exemplary embodiment of the present disclosure.

FIG. 2 is a diagram of a method of accessing the data storage device through a control device in accordance with the exemplary embodiment of the present disclosure.

Referring to FIG. 2, when the programming device cannot perform the read-write operation directly on the Flash as the SPI controller of the TCON occupies the SPI bus, the programming device may transmit the mode switch control command to the TCON via the I2C interface through the I2C bus, wherein the mode switch control command is used to switch the SPI interface of TCON to the Master mode or the Slave mode. Specifically speaking, the programming device may transmit different mode switch commands to the TCON based on the predetermined transmission protocol between the programming device and the TCON so as to control the TCON between the Master mode and the Slave mode. For example, when receiving instructions 0xC1 and 0xA1 from the programming device, the TCON may initiate the Master module included in the SPI controller so as to switch the SPI interface to the Mater mode, and when receiving instructions 0xC1 and 0xA0 from the programming device, the TCON may initiate the Slave module included in the SPI controller so as to switch the SPI interface to the Slave mode.

Preferably, in order to ensure the effectiveness of the mode switch, after switching the mode of the SPI interface by transmitting the above instructions, the programming device may determine whether the SPI interface of the TCON has been switched to the Master mode or the Slave mode by transmitting a determination instruction, for example, the programming device may transmit the instruction 0xC2 to the TCON via the I2C interface through the I2C bus, then read the status data generated by the TCON and corresponding to the current mode of the SPI interface, if the read status data is 0xA1, it can be determined that the SPI controller has been switched to the Master mode, while if the read status data is not 0xA1, it means that the SPI controller is still in the Slave mode. The above determination operation may ensure that the SPI interface may be in the desired work mode so as to facilitate the next operation. It should be understood that, the above mode switch control instruction and mode confirmation instruction are only examples, while the exemplary embodiment of the present disclosure is not limited thereto.

In case where the SPI interface is switched to the Master mode, the TCON may receive the write command and the data to be written or the read command from the programming device via the I2C interface through the I2C bus, and may buffer the received command and data in the cache. In addition, in order to allow the command and data received through the I2C bus to be transmitted to the data storage device through the SPI bus, the TCON may convert the received command and data into the SPI bus format and transmit the same to the Flash, so as to write the data to be written into the Flash based on the received write command or to read the data from the Flash based on the received read command. Then, the TCON may buffer the data read from the Flash in the cache, and the programming device may read the data from the cache of the TCON through the I2C interface thereafter. However, the above method of reading the Flash by means of converting from the I2C bus to the SPI bus lacks efficiency, which may be used when amount of the read/written data is relatively small. When the amount of the read/written data is large, the programming device may switch the SPI interface of the control device to the Slave mode by transmitting the mode switch control command so as to directly access the data storage device through the SPI bus, thereby significantly increasing the data access speed. In this instance, the I2C bus only needs to receive the mode switch control command transmitted by the programming device for converting the SPI interface of the TCON to the Slave mode, and may no longer perform the operation of reading/writing data.

Here, the method of accessing the data storage device through the control device in accordance with the exemplary embodiment of the present disclosure has been illustrated in detail with reference to FIG. 1 and FIG. 2. Here, a configuration of a control device in accordance with the exemplary embodiment of the present disclosure will be illustrated with reference to FIG. 3.

Figure 3:
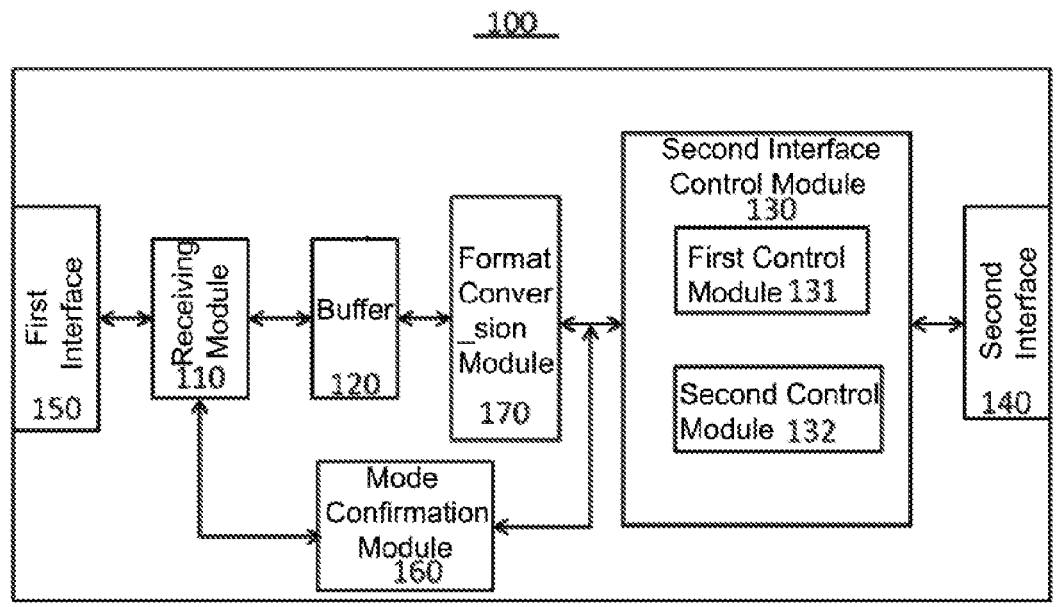
FIG. 3 is a block diagram of a control device in accordance with the exemplary embodiment of the present disclosure.

As shown in FIG. 3, the control device 100 may include a receiving module 110, a second interface control module 130 and a second interface 140. In addition, the control device 100 may also include a buffer 120, a first interface 150, a mode confirmation module 160 and a format conversion module 170. It should be understood that the control device 100 according the exemplary embodiment of the present disclosure may also include other modules, such as a clock control module, other interfaces and an interface control module, etc.

The receiving module 110 is used to receive the mode switch control command through the first bus, and the mode switch control command is used for controlling to switch a second interface 140 of the control device 100 to a predetermined mode. As an example, the receiving module 110 may receive the mode switch control command via the first interface 150 of the control device 100 through the first bus. Referring to FIG. 1, the predetermined mode may include the first mode and the second mode. As an example, when the second interface 140 is the SPI interface, the first mode may be a Master mode, and the second mode may be a Slave mode. In addition, the receiving module 110 may also be used to receive a write command about the data storage device or data to be written, or a read command about the data storage device via the first interface 150 of the control device 100 through the first bus, as an example, the first interface may be an I2C interface, and the first bus may be a I2C bus corresponding to the first interface. In this instance, the buffer 120 included in the control device 100 may be used to buffer the received command and data, and the format conversion module 170 in accordance with the exemplary embodiment of the present disclosure may be used to convert the received write command and the data or the read command into a format which may be transmitted through the second bus corresponding to the second interface 140. At this time, the second interface 140 may also be used to transmit the converted command and data to the data storage device via through the second bus.

The second interface control module 130 is used to switch the second interface of the control device to a predetermined mode based on the mode switch control command. In accordance with an exemplary embodiment of the present disclosure, the second interface control module 130 may include a first control module 131 and a second control module 132. Specifically speaking, when the first control module 131 is initiated, the second interface 140 may be in the first mode, and when the second control module 132 is initiated, the second interface 140 may be in the second mode. In accordance with an exemplary embodiment of the present disclosure, in the first mode, the input device may access the data storage device under the control of the first control module 131 via the second interface 140 through the second bus, and in the second mode, the input device may directly access the data storage device through the second bus without the control of the control device 100. As an example, when the second interface 140 is the SPI interface, the first control module 131 may be the Master module corresponding to the Master mode, and the second control module 132 may be the Slave module corresponding to the Slave mode.

The second interface 140 is used to access the data storage device connected to the control device through the second bus corresponding to the second interface 140. In accordance with another aspect of an exemplary embodiment of the present disclosure, in case where the second interface 140 is switched to the first mode, the input device connected to the second bus corresponding to the second interface 140 may access the data storage device via the second interface 140 through the second bus, in case where the second interface 140 is switched to the second mode, the input device may directly access the data storage device through the second bus without the control of the control device 100.

In addition, in order to facilitate subsequent operation, the input device may need to further determine whether the second interface 140 of the control device 100 has been switched to a predetermined mode. Thus, the control device 100 according the exemplary embodiment of the present disclosure may also include a mode confirmation module 160. The mode confirmation module 160 may generate the status data corresponding to the current mode of the second interface 140 based on the mode confirmation instruction received from the input device, and return the status data, so that input device may determine whether the second interface 140 has been switched to a predetermined mode based on the status data.

In accordance with an exemplary embodiment of the present disclosure, the input device connected with the control device 100 to the same bus may be a programming device. Here, taking the programming device for example to illustrate the input device and the data storage device access method of the input device.

Figure 4:
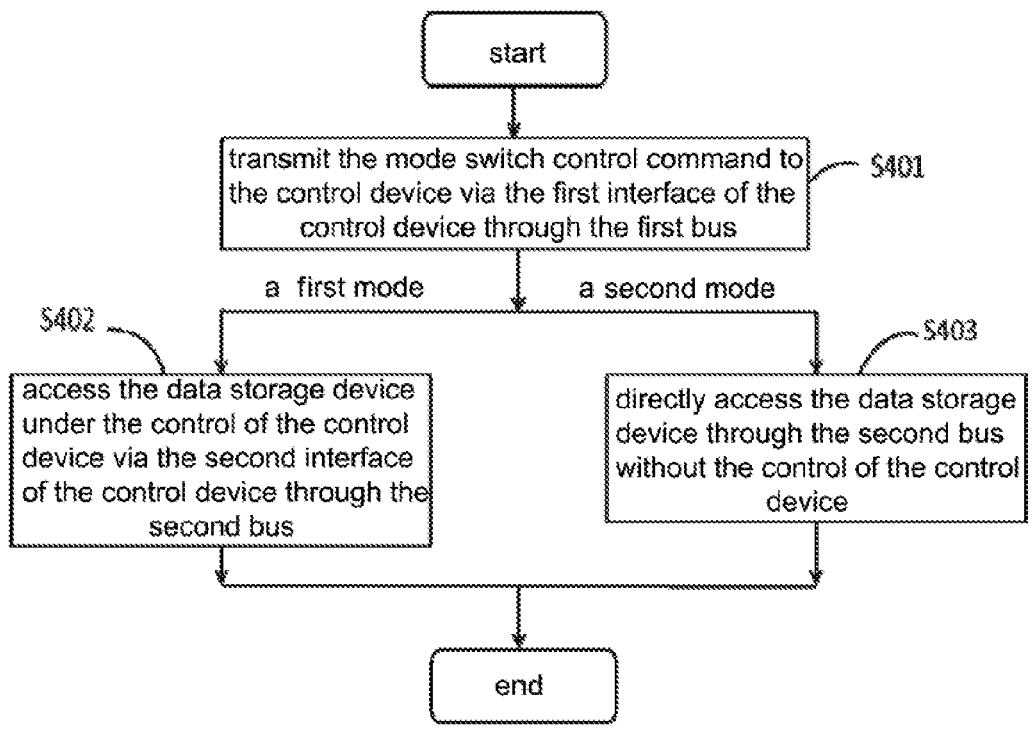
FIG. 4 is a flow diagram of a method of accessing the data storage device by a programming device in accordance with the exemplary embodiment of the present disclosure.

FIG. 4 is a flow diagram of a method of accessing the data storage device by a programming device in accordance with the exemplary embodiment of the present disclosure.

Referring to FIG. 4, in case where the programming device desires to access the data storage device when the bus of the data storage device is occupied by the control device, in step S401, the programming device may transmit the mode switch control command to the control device via the first interface of the control device through the first bus so as to switch the second interface of the control device to the predetermined mode. As mentioned above, the predetermined mode includes the first mode and the second mode. In case where the second interface of the control device is switched to the first mode in accordance with the mode switch control command, in step S402, the programming device may access the data storage device under the control of the control device via the second interface of the control device, while in case where the second interface of the control device is switched to the second mode in accordance with the mode switch control command, in step S403, the programming device may directly access the data storage device through the second bus without the control of the control device. Alternately, the programming device may also transmit the mode confirmation instruction to the control device and may receive from the control device the status data corresponding to the current mode of the second interface generated received by the control device based on the mode confirmation instruction, so as to determine whether the second interface of the control device has been switched to a predetermined mode based on the received status data.

Figure 5:
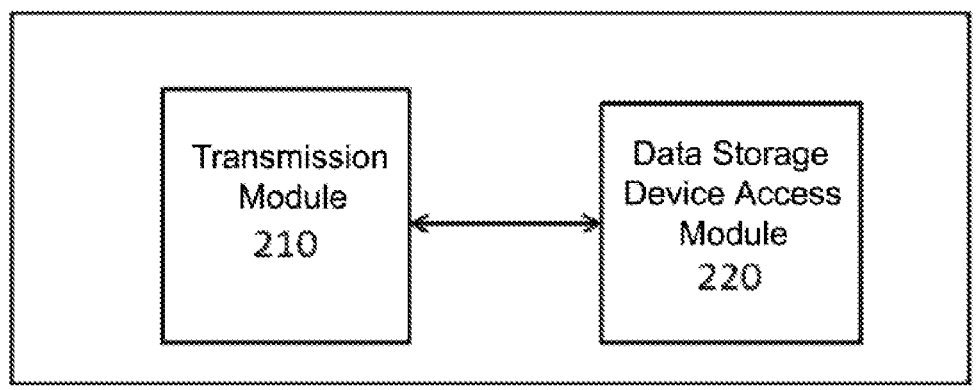
FIG. 5 is a block diagram of a programming device in accordance with the exemplary embodiment of the present disclosure.

FIG. 5 is a block diagram of a programming device in accordance with the exemplary embodiment of the present disclosure.

Referring to FIG. 5, the programming device 200 may include the transmission module 210 and the data storage device access module 220. In addition, the programming device 200 may also include input modules, such as various interfaces (e.g. I2C interface, SPI interface, etc.) and the corresponding interface control module. Specifically speaking, the transmission module 210 may transmit the mode switch control command to the control device via the first interface of the control device through the first bus. Here, the mode switch control command is used for switching the second interface of the control device to a predetermined mode, and the predetermined mode may include the first mode and the second mode. In case where the data storage device access module 220 may switch the second interface to the first mode in accordance with the mode switch control command, the data storage device is accessed under the control of the control device via the second interface through the second bus, and in case where the data storage device access module 220 may switch the second interface to the second mode in accordance with the mode switch control command, the data storage device is directly accessed through the second bus without the control of the control device.

Figure 6:
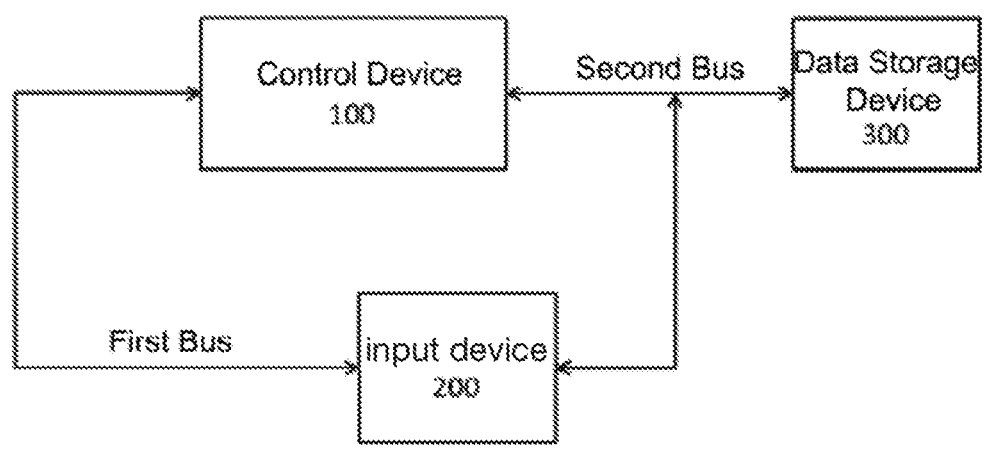
FIG. 6 is a diagram of a method of a data storage device access system and a data storage device access method thereof in accordance with the exemplary embodiment of the present disclosure.

FIG. 6 is a diagram of a method of a data storage device access system and a data storage device access method thereof in accordance with the exemplary embodiment of the present disclosure.

Referring to FIG. 6, the data storage device access system 400 in accordance with the exemplary embodiment of the present disclosure may include the first bus and the second bus, the control device 100 connected to the second bus, the input device 200 and the data storage device 300. When the input device 200 desires to access the data storage device 300, the input device 200 may transmit the mode switch control command to the control device 100 via the first interface of the control device through the first bus so as to switch the second interface of the control device 1100 to the predetermined mode. Then, the control device 100 may switch the second interface of the control device 100 to a predetermined mode based on the received mode switch control command. In accordance with an exemplary embodiment, the predetermined mode may include the first mode and the second mode. The data storage device 300 may be accessed by the control device and the input device. In accordance with an exemplary embodiment, in case where the control device 100 switches the second interface thereof to the first mode in accordance with the mode switch control command, the input device 200 may access the data storage device 300 under the control of the control device 100 via the second interface through the second bus, while in case where the control device 100 switches the second interface thereof to the second mode in accordance with the mode switch control command, the input device 200 may directly access the data storage device through the second bus without the control of the control device.

As mentioned above, the method, device and system for accessing the data storage device in accordance with the exemplary embodiment of the present disclosure may effectively solve the problem of conflict occurred in accessing the data storage device caused by more than one bus Master on the bus, and may provide the data storage device access methods compatible to two types of buses at the same time, which facilitate the reading/writing of large amount of data. In addition, in terms of the hardware, the peripheral Switch IC may be spared, thereby simplifying the circuit design, and reducing the cost.

The method in accordance with the present disclosure may be recorded in a computer readable medium including program instructions for executing various operations achieved by computer. Examples of the computer readable recording medium include: magnetic medium (such as hard disc, floppy disk and magnetic tape); optical medium (such as CD-ROM and DVD); magneto-optical medium (such as optical disc); hardware devices specifically configured for storing and executing program instructions (such as Read Only Memory (ROM), Random Access Memory (RAM), Flash Memory, etc.). Examples of the program instructions include, for example, machine codes generated by compilers, and files including advanced codes executable by computers using interpreter.

In addition, the respective modules in the control device in accordance with the exemplary embodiment of the present disclosure may be implemented as hardware components or software components, which may be combined in accordance with the practical demands. In addition, those skilled in the art may implement respective modules by using, for example, field-programmable gate array (FPGA) or application-specific integrated circuit (ASIC), in accordance with the processes performed by respective defined modules.

Although the present disclosure has been particularly shown and described with reference to exemplary embodiments thereof, it will be understood by those skilled in the art that various changes in form and details may be made therein without departing from the spirit and scope of the present disclosure as defined by the follows claims.

The invention claimed is:

1. A method of accessing a data storage device through a control device, comprising:

receiving a mode switch control command through a first bus via a first interface of the control device, wherein the mode switch control command is used for controlling to switch a second interface of the control device to a predetermined mode; and switching the second interface of the control device to the predetermined mode based on the received mode switch control command, wherein the predetermined mode includes a first mode and a second mode, wherein in case where the second interface is switched to the first mode in accordance with the mode switch control command, an input device connected to a second bus corresponding to the second interface accesses the data storage device under the control of the control device via the second interface through the second bus; in case where the second interface is switched to the second mode in accordance with the mode switch control command, the input device directly accesses the data storage device through the second bus without the control of the control device, and wherein switching the second interface of the control device to the predetermined mode includes activating a first control module corresponding to the first mode and a second control module corresponding to the second mode in the control device in accordance with the mode switch control command, wherein when the first control module is initiated, the second interface is in the first mode, when the second control module is initiated, the second interface is in the second mode, wherein in the first mode, the input device accesses the data storage device under the control of the first control module via the second interface through the second bus, and in the second mode, the input device directly accesses the data storage device through the second bus without the control of the control device.

2. The method of claim 1, comprising generating status data corresponding to a current mode of the second interface based on a mode confirmation instruction received by the control device so that the input device determines whether the second interface has been switched to the predetermined mode based on the status data.

3. The method of claim 1, wherein steps of accessing the data storage device via the second interface through the second bus include receiving a write command or data to be written, or a read command about the data storage device via the first interface of the control device through the first bus, and buffering the received command and data, wherein steps of accessing the data storage device via the second interface through the second bus further include converting the received write command and the data to be written or the read command into a format which are transmitted through the second bus, and transmitting the converted command and data to the data storage device via the second interface through the second bus.

4. The method of claim 1, wherein the first interface is an I2C interface, and the first bus is an I2C bus; the second interface is an SPI interface, the second bus is an SPI bus, the first mode is a Master mode, and the second mode is a Slave mode; control device is a timer controller, the input device is a programming device, and the data storage device is a Flash.

5. A control device comprising:

a receiving module configured to receive a mode switch control command through a first bus via a first interface of a control device, wherein the mode switch control command is used for controlling to switch a second interface of the control device to a predetermined mode, wherein the predetermined mode includes a first mode and a second mode; and a second interface control module configured to switch the second interface of the control device to the predetermined mode in accordance with the mode switch control command, wherein the second interface is configured to access a data storage device connected to the control device through the second bus corresponding to the second interface, wherein in case where the second interface is switched to the first mode, an input device connected to the second bus corresponding to the second interface accesses the data storage device via the second interface through the second bus, and in case where the second interface is switched to the second mode, the input device directly accesses the data storage device through the second bus without the control of the control device, and wherein the second interface control module includes a first control module corresponding to the first mode and a second control module corresponding to the second mode, wherein the control device initiates the first control module and the second control module in accordance with the mode switch control command, wherein when the first control module is initiated, the second interface is in the first mode, when the second control module is initiated, the second interface is in the second mode, wherein in the first mode, the input device accesses the data storage device under the control of the first control module via the second interface through the second bus, and in the second mode, the input device directly accesses the data storage device through the second bus without the control of the control device.

6. The control device of claim 5, wherein the receiving module is also be configured to receive a mode confirmation instruction, wherein the control device further includes: a mode confirmation module configured to generate status data corresponding to a current mode of the second interface based on the received mode confirmation instruction so that the input device determines whether the second interface has been switched to the predetermined mode based on the status data.

7. The control device of claim 5, wherein the receiving module is also configured to receive a write command or data to be written, or a read command about the data storage device via the first interface of the control device through the first bus, wherein the control device further includes:

a cache configured to buffer the received command and data; and a format conversion module configured to convert the received write command and the data or the read command into a format which are transmitted through the second bus, wherein the second interface is also configured to transmit the converted command and data to the data storage device through the second bus.

8. The control device of claim 5, wherein the first interface is an I2C interface, and the first bus is an I2C bus; the second interface is an SPI interface, the second bus is an SPI bus, the first mode is a Master mode, and the second mode is a Slave mode; the control device is a timer controller, the input device is a programming device, and the data storage device is a Flash.

9. A method of accessing a data storage device by an input device, comprising:

transmitting a mode switch control command to a control device via a first interface of the control device through a first bus, wherein the mode switch control command is used for switching a second interface of the control device to a predetermined mode, wherein the predetermined mode includes a first mode and a second mode;

in case where the second interface is switched to the first mode in accordance with the mode switch control command, accessing the data storage device under the control of the control device via the second interface through the second bus; and in case where the second interface is switched to the second mode in accordance with the mode switch control command, the data storage device is directly accessed through the second bus without the control of the control device, wherein in case where the second interface is switched to the first mode, a first control module corresponding to the first mode is initiated, and in case where the second interface is switched to the second mode, a second control module corresponding to the second mode is initiated in the control device in accordance with the mode switch control command, wherein when the first control module is initiated, the second interface is in the first mode, when the second control module is initiated, the second interface is in the second mode, wherein in the first mode, the input device accesses the data storage device under the control of the first control module via the second interface through the second bus, and in the second mode, the input device directly accesses the data storage device through the second bus without the control of the control device.

* * * * *